(12) United States Patent
Wild et al.

(10) Patent No.: US 6,786,197 B2
(45) Date of Patent: Sep. 7, 2004

(54) METHOD AND DEVICE FOR CONTROLLING THE DRIVE UNIT OF A VEHICLE

(75) Inventors: Ernst Wild, Oberriexingen (DE); Lilian Matischok, Stuttgart (DE); Michael Nicolaou, Ober-Ramstadt (DE); Werner Hess, Stuttgart (DE); Holger Jessen, Schwieberdingen (DE); Werner Kind, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 10/149,956

(22) PCT Filed: Dec. 16, 2000

(86) PCT No.: PCT/DE00/04469

§ 371 (c)(1),
(2), (4) Date: Nov. 12, 2002

(87) PCT Pub. No.: WO01/44644

PCT Pub. Date: Jun. 21, 2001

(65) Prior Publication Data

US 2003/0098012 A1 May 29, 2003

(30) Foreign Application Priority Data

| Dec. 18, 1999 | (DE) | 199 61 291 |
| Apr. 4, 2000 | (DE) | 100 16 648 |
| May 12, 2000 | (DE) | 100 60 298 |

(51) Int. Cl.$^7$ .............................................. F02D 41/26
(52) U.S. Cl. ...................... 123/350; 123/399; 123/295; 123/406.23
(58) Field of Search .................... 123/399, 350, 123/295, 406.23

(56) References Cited

U.S. PATENT DOCUMENTS

| 4,708,111 | A | | 11/1987 | Shiozaki et al. | |
| 4,945,870 | A | * | 8/1990 | Richeson | 123/90.11 |
| 5,615,654 | A | * | 4/1997 | Weisman et al. | 123/350 |
| 6,330,873 | B1 | * | 12/2001 | Letang et al. | 123/322 |
| 2002/0073946 | A1 | * | 6/2002 | Lou | 123/90.12 |
| 2004/0045524 | A1 | * | 3/2004 | Matishchuk et al. | 123/350 |

FOREIGN PATENT DOCUMENTS

| DE | 197 39 567 | 3/1999 |
| EP | 0 821 150 | 1/1998 |
| EP | 0 937 886 | 8/1999 |

* cited by examiner

*Primary Examiner*—Erick Solis
(74) *Attorney, Agent, or Firm*—Kenyon & Kenyon

(57) ABSTRACT

A method and a device for controlling the drive unit of a vehicle are provided, in which, in addition to the selection variable for an output variable of the drive unit, another setpoint variable representing the required dynamic setting of the output variable is preselected. The manipulated variable of the drive unit to be influenced is selected on the basis of the selection variable and the additional setpoint variable.

12 Claims, 6 Drawing Sheets

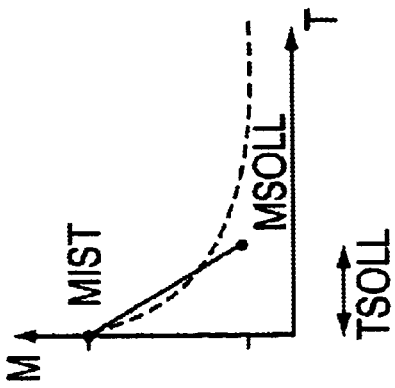
FIG. 6a
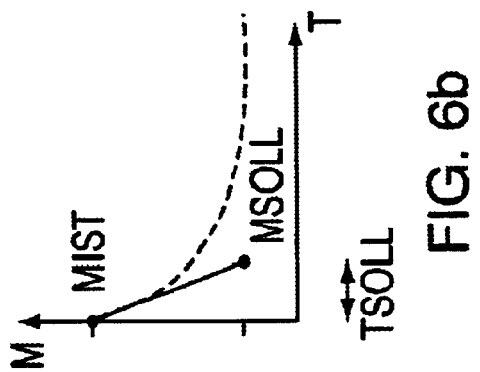
FIG. 6b
FIG. 6c
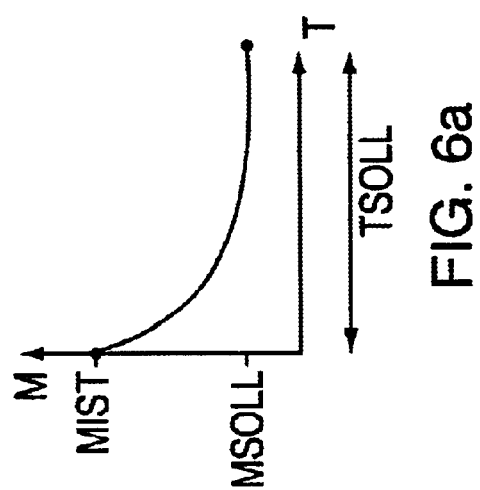
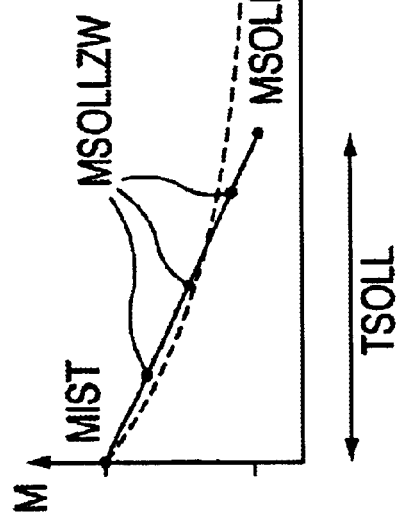
FIG. 6d

METHOD AND DEVICE FOR CONTROLLING THE DRIVE UNIT OF A VEHICLE

FIELD OF THE INVENTION

The present invention relates to a method and a device for controlling the drive unit of a motor vehicle.

BACKGROUND INFORMATION

German Published Patent Application No. 197 39 567 refers to the control of a drive unit, in which a plurality of setpoint assignments, some of which have contradictory effects, act on actuators. For example, the drive unit may be controlled in accordance with driver intent, setpoints of external and/or internal regulating and control functions (such as a traction control), an engine drag-torque control, a transmission control, a speed limiter, and/or an idle speed regulator. To coordinate these setpoint assignments (i.e., to determine a setpoint assignment to be implemented), a setpoint is selected from setpoints supplied through selection of maximum and minimum values. This setpoint is implemented in a momentary operating state of the drive unit through the individual control parameters of the drive unit. In an exemplary internal combustion engine according to the present invention, these control parameters may include, for example, the filling, the firing angle and/or the quantity of fuel. Conversion of the setpoints to forced values may be performed according to the origin of the setpoint assignment. For example, separate setpoint assignments may be formed for a relatively slow filling actuation path and for a relatively rapid ignition actuation path. This may limit the flexibility of selecting control parameters for implementation of the setpoint assignment.

SUMMARY OF THE INVENTION

It is believed to be advantageous in that an implementation of the setpoint variable on the basis of a continuously variable actuating time may permit a more precise assignment and implementation of intervening measures.

Through implementation of the setpoint assignment via the filling path and enabling of rapid intervention measures, such as ignition and fuel suppression, if necessary, the choice of the actuating path is made independently of the origin of the setpoint assignment. Furthermore, optimal utilization of the achievable torque via the filling path may improve overall efficiency. The optimization potential at high rotational speeds, for example, may be utilized through a choice of actuating path as a function of operating point, since the efficiency-reducing firing angle and fuel intervention measures occur only when the setpoint variable may not be reached via the filling path.

BRIEF DESCRIPTION OF THE DRAWINGS

FIG. 6 shows time diagrams illustrating the actual torque curve in various situations, when using an exemplary embodiment according to the present invention.

DETAILED DESCRIPTION

Figure 1:
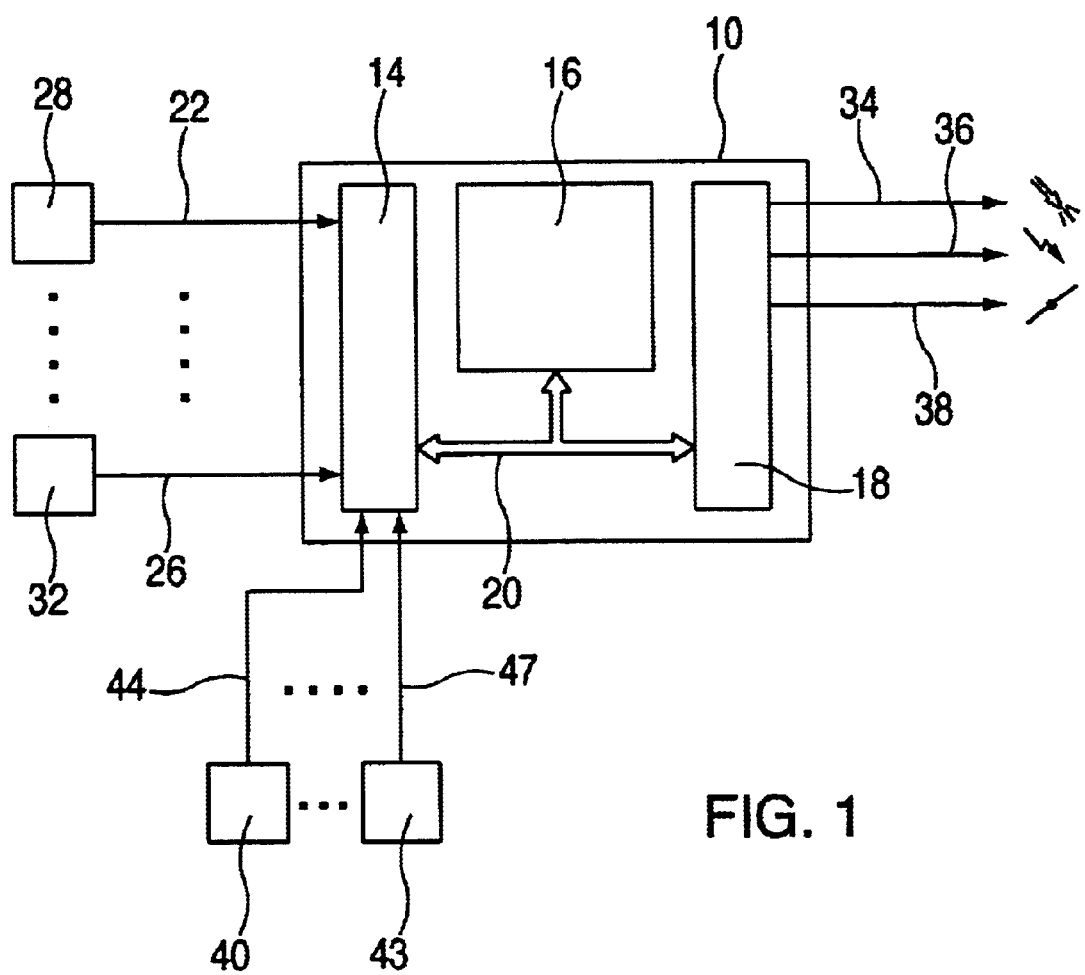
FIG. 1 is a survey diagram of a control unit for controlling a drive unit.

FIG. 1 is a block diagram of a control device for controlling a drive unit, for example, of an internal combustion engine. A control unit 10 includes input circuit 14, at least one computer unit 16 and an output circuit 18. A communications system 20 connects these components for mutual data exchange. Input lines 22 through 26 lead to input circuit 14 of control unit 10. In an exemplary embodiment according to the present invention, these input lines form a bus system and carry signals to control unit 10, representing operating variables to be analyzed for controlling the drive unit. These signals are detected by measuring devices 28 through 32. Such operating variables may include, for example, the accelerator pedal position, engine speed, engine load, exhaust gas composition, engine temperature, etc. Control unit 10 controls the power of the drive unit via output lines 34, 36 and 38 of output circuit 18. The output lines 34, 36 and 38 actuate the fuel mass to be injected, the firing angle of the engine and/or at least one electrically operable throttle valve to adjust the air supply fed to the engine. In addition to these input variables, other control systems of the vehicle may relay selection variables, e.g., torque setpoints, to input circuit 14. Such control systems may include, for example, traction control, ESP, transmission controls, engine drag-torque controls, etc. The air supply fed to the engine, the firing angle of the individual cylinders, the fuel mass to be injected, the injection time and/or the air/fuel ratio, etc., may be adjusted via the actuating paths illustrated in FIG. 1. In addition to these setpoint assignments, external setpoint assignments may be provided, which may include a setpoint assignment by the driver representing the driver's intent and/or a speed limiting function. Internal assigned variables for controlling the drive unit may also be provided. These internal assigned variables may include, for example, a change in torque of an idle speed regulator, a rotational speed limiter, which outputs a corresponding setpoint selection variable, a change-in-torque limiter, limitations arising from component protection and/or a separate setpoint selection variable in startup.

Boundary conditions or properties representing the type and manner of implementation of the setpoint selection variable are associated with the individual setpoint selection variables. Depending on the application, one or more properties (i.e., property vector, into which various property variables may be entered) may be associated with a setpoint selection variable. Properties of setpoint selection variables may include, for example, the required dynamics in adjusting the setpoint selection variable, the priority of the setpoint selection variable, the quantity of torque reserve to be set and/or the comfort of the adjustment (e.g., change limiting). Other embodiments may include more or fewer properties, or even only one property.

In another exemplary embodiment according to the present invention, the actuating time, within which the torque setpoint assignment is to be adjusted, is assigned as a property to each torque setpoint assignment. Furthermore, a predicted setpoint torque is preselected, which essentially corresponds to the unfiltered driver's intent value and the external reserve torques of accessory units, such as the air conditioning compressor, generator, converter, etc., and are calculated into the internal torque reserves, e.g., of the idle speed regulator, a catalyst heating function, etc. This predicted torque is considered in converting the assigned torque to at least one manipulated variable of the drive unit.

Instead of the assignment of torque setpoints, other variables may be preselected, likewise representing output variables of the drive unit, such as the rotational speed, power, etc.

Figure 2:
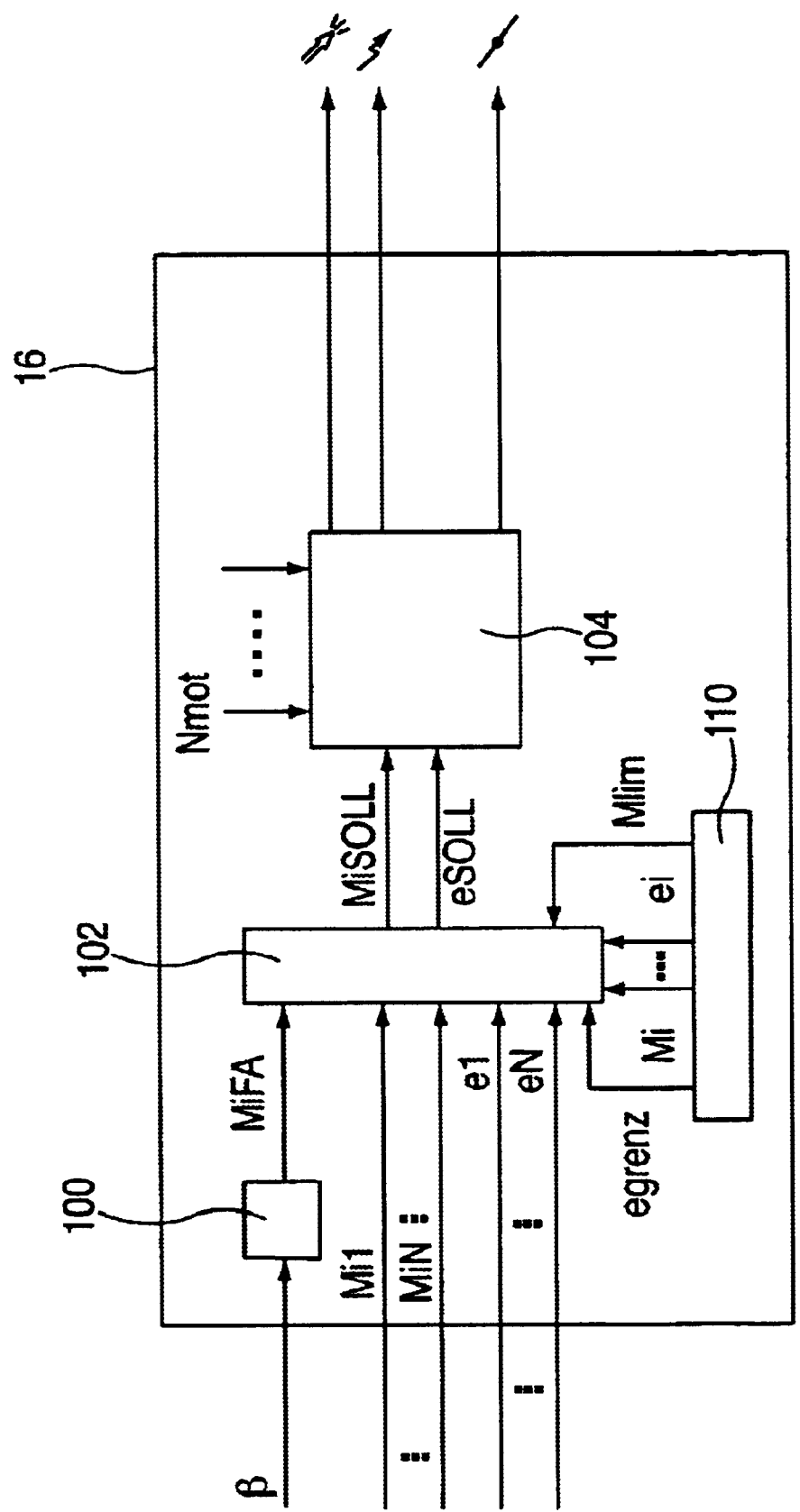
FIG. 2 is a flow chart illustrating the coordination of the setpoint assignments of properties and their implementation.

FIG. 2 is a flow chart showing steps of a process performed in computer unit 16 of the control unit, which describes the coordination and conversion of setpoint assignments and their properties. Computer unit 16 receives a variable representing accelerator pedal position β. In a calculation step 100, computer unit 16 converts the variable, optionally considering other operating variables, such as engine speed, into a driver's intended torque MiFA. This torque MiFA is then sent to a coordinator 102. Furthermore, external torque setpoints Mi1 through MiN are relayed to computer unit 16 and sent to coordinator 102. Selected property variables (or property vectors having individual property variables) e1 through eN are relayed with each torque setpoint and sent to coordinator 102. In addition, internal functions 110 either send torque setpoints with corresponding property variables to coordinator 102 or assign limit values Mlim for the torque setpoints or egrenz for the property variables, which are also sent to coordinator 102 and are considered in coordination of the setpoint values and property values. The output of coordinator 102 is a resulting torque setpoint value MiSOLL, which is used for the adjustment and the resulting property variable(s) eSOLL, selected from the property variables supplied, considering the limit values, within the context of which the setpoint is implemented. These variables are sent to a converter 104, which also receives other operating variables such as the engine speed, etc. The converter 104 converts torque setpoint MiSOLL, considering the operating variables supplied and the resulting property variable(s), into manipulated variables. These manipulated variables influence fuel metering, firing angle, air feed, etc., so that the preselected torque setpoint is adjusted within the framework of the resulting property (properties).

As described below, the actuation paths to be selected for implementation of the torque setpoint are determined independently of the source of the torque request, on the basis of the dynamic information (actuating time) assigned to the torque setpoint. First, it is determined whether the requested change in torque setpoint may be implemented with the required dynamics exclusively via the filling path. This may occur in accordance with the prevailing operating point and the requested change in torque on the basis of an engine characteristics map, optionally by interpolation of the selected minimum actuating time via the filling path. A central input variable represents therefore the dynamic information supplied with the torque setpoint, this information being either a required actuating time within which the torque setpoint is to be set, or a requirement in the form of logical variables (highly dynamic, dynamic, slow). This is interpreted as an additional setpoint assignment, which should be maintained under the given boundary conditions, for example, the operating state of the drive unit.

If the actuating time requirement, predetermined by the property input variable, is less than the actuating time feasible via the air path, i.e., the required dynamics may not be achieved only through intervention in the filling path, the firing angle intervention measure is enabled. In addition, the firing angle intervention measure is enabled if additional requirements necessitate an adjustment of the firing angle efficiency, e.g., due to external or internal reserve requirements, as a reserve for a quick torque intervention measure in the sense of increasing torque, or when measures having a direct influence on efficiency, such as catalytic converter heating, are active due to ignition retard. If the firing angle intervention measure is enabled, a deterioration in efficiency, due to the altered firing angle, is allowed. If the firing angle intervention measure is not enabled, the firing angle is set for the optimum firing angle according to a predetermined engine characteristics map, through which a maximum torque is implemented at a given operating point.

A torque setpoint is preselected for the firing angle path if the firing angle is enabled. This occurs in reducing intervention measures by outputting a setpoint in the time grid of the firing angle, which is obtained by interpolation between the momentary actual torque and the torque setpoint to be achieved at the predetermined actuating time. The interpolation guarantees, or at least makes more probable, that the filling path is preferred due to the torque curve resulting from the delayed response of the filling path, because the interpolated torque setpoint is above this curve. That is, the change in torque via the firing angle occurs as rapidly as necessary to maintain the predetermined actuating time. In addition to the firing angle adjustment, the torque setpoint is implemented via the filling path, i.e., a setpoint value for controlling an actuator, which influences the air supply, is preselected from the torque setpoint for the filling path. This actuator adjusts the torque setpoint via the filling path. In the case of torque-increasing intervention measures, the torque setpoint for the firing angle results from the maximum of the torque, interpolated as described above, and the basic torque, i.e., the torque of the filling path, so that torque-decreasing firing angle intervention measures may be avoided. As an alternative, the ignition retard performed via interpolation may be retained in implementation of a torque reserve (e.g., for catalytic converter heating or idling).

The torque setpoints are implemented by converting the torque setpoint for filling to a setpoint for the position of a throttle valve (via a filling model), which is then regulated in the context of a position control loop, while the firing angle torque setpoint is converted into a change in firing angle, which is used to correct the optimum firing angle by considering the actual torque value. The filling torque setpoint and the firing angle torque setpoint may have different values.

The decision as to whether the required actuating time is feasible via the air path is based on a table or an engine characteristics map, as described above. The operating point of the engine is determined by the state variables of the filling path (e.g., load or relative cylinder filling) and by the rotational speed of the engine.

The fuel supply, for example, suppression of individual injections, may be available as an additional actuating path, which allows a dynamic charge in torque. A decision regarding enabling this suppression is made on the basis of the dynamic information (actuating time), which is also supplied. This suppression is enabled only when the torque setpoint to be set in the required dynamics is less than the torque adjustable via the air path and the firing angle path within this actuating time. This may also be determined on the basis of a table or an engine characteristics map. Fuel suppression is thus the last actuating path to be activated to adjust the torque setpoint in the required actuating time.

This procedure is described above with respect to throttled operation of an internal combustion engine. However, this procedure may also be applied to unthrottled operation (stratified charge operation), if an engine, for example, has direct injection. In this case, the torque setpoint may not be implemented via the filling path. Nevertheless, the procedure described above may be adapted to stratified charge operation. The required dynamics of the quick path may be achieved through the injected quantity in stratified charge operation. Nevertheless, individual injections may also be suppressed if the torque to be set is not achievable within the required actuating time through the change in the injection quantity.

In another exemplary embodiment according to the present invention, the procedure described above is implemented as a program for execution on computer element 16 of control unit 10. An example of such a program is diagramed as a flow chart in FIGS. 3 through 5. The program or programs may be executed as a function of time or, for example, as a function of rotational speed.

Figure 3:
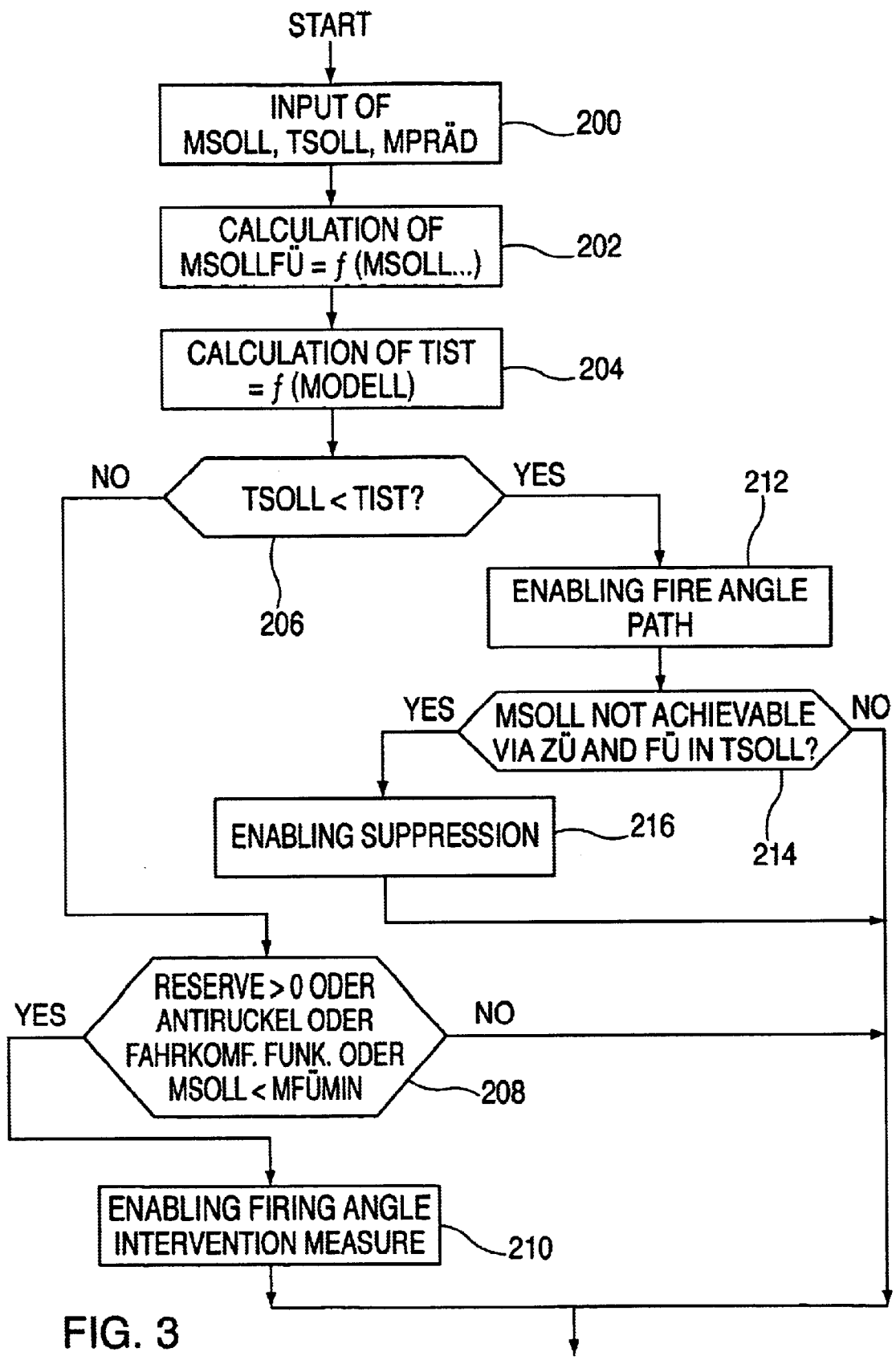
FIGS. 3 through 5 are flow charts illustrating an exemplary embodiment for conversion of the setpoint assignment and a respectively assigned actuating time into individual actuating paths.

Referring now to FIG. 3, in first step 200, the input variables on which the conversion is based are input. These variables may include, for example, torque setpoint MSOLL, required actuating time TSOLL and predicted torque MPRÄD. The latter may represent the unfiltered driver's intent and thus may represent the torque presumably to be set in the future, since the driver's intended torque is filtered for reasons of comfort and is replaced or corrected by internal or external functions, which influence the torque. These functions may include, for example, traction control, limiting functions, etc. In step 202, the torque setpoint for filling path MSOLLFÜ is determined by considering additional functions, such as load reversal damping functions, dashpot functions or reserves. A exemplary procedure for determining the torque setpoint for the filling path according to the present invention is illustrated in the flow chart of FIG. 4 and is described below.

In step 204, a minimum actuating time TIST, which is required to adjust the torque setpoint via the filling path, is determined as described above, e.g., on the basis of a table or an engine characteristics map. Then, step 206 determines whether calculated actual time TIST is greater than preselected setpoint time TSOLL. If not, then it is ensured, or at least made more probable, that the torque setpoint is adjustable via the filling path in the required actuating time. Therefore, the firing angle intervention measure is not enabled. Step 208 checks the additional conditions, under which a firing angle intervention may be enabled independently of the actuating time. These conditions may include, for example, activation of an anti-jerk function, the requirement for setting a torque reserve greater than zero, activation of a driving comfort function, such as a load reversal damping function or a dashpot function and/or keeping torque setpoint MSOLL below a minimum filling torque MF ÜMIN. If one of these conditions is met, then the firing angle intervention measure is enabled in step 210. Otherwise, the program is terminated after step 208 and is re-executed.

If step 206 determines that the minimum actuating time within which the torque setpoint is adjustable via the filling path is greater than the required actuating time, then the firing angle intervention measure is enabled in step 212. Then, step 214 determines whether the torque setpoint is achievable via the firing angle intervention measure and whether the filling intervention measure is achievable within actuating time TSOLL, on the basis of tables or engine characteristics maps. If not, then suppression is enabled in step 216 to ensure that the torque setpoint is adjusted within the actuating time. If so, enabling of the firing angle path is sufficient. Thus, the program terminates after step 214 or 216 and is re-executed. A determination may be performed in step 214, e.g., on the basis of an engine characteristics map, to determine whether the preselected firing angle adjustment is feasible at the momentary operating point of the drive unit. If the change in torque due to the firing angle is too slow or if the amount of change in torque via firing angle is not feasible, fuel injection is suppressed.

Figure 4:
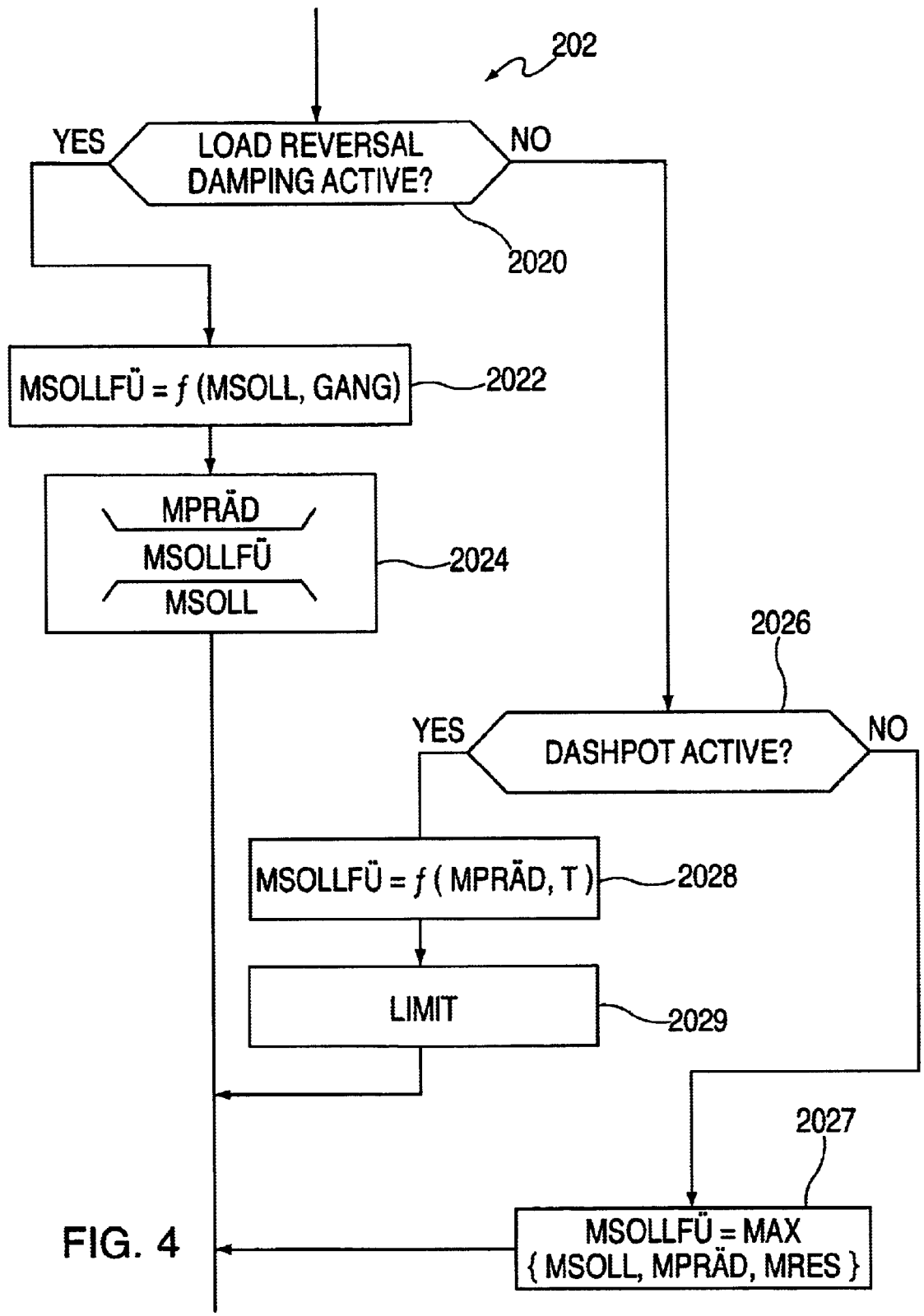

FIG. 4 shows further detail of step 202 shown in FIG. 3, according to which the torque setpoint for filling path MSOLLFÜ is determined on the basis of at least the torque setpoint. Step 2020 determines whether a load reversal damping function is active, for example, when a load reversal from coasting operation to traction operation of the drive unit is detected. If this function is active, torque setpoint MSOLLFÜ for the filling path is determined from a map on the basis of gear setting GANG and torque setpoint MSOLL (step 2022). In step 2024, setpoint filling torque MSOLLFÜ is optionally limited to a maximum value or a minimum value. The maximum value corresponds to predicted torque MPRÄD, which represents essentially the unfiltered intended torque of the driver, and the minimum value of torque setpoint MSOLL is formed. Then, the procedure is continued with step 204 in the program according to FIG. 3. If step 2020 determines that the load reversal damping function is not active, then step 2026, determines whether the dashpot function is active, for example, when the driver releases the accelerator pedal very rapidly. If so, the dashpot function smooths the change in torque in the transition from when the accelerator pedal is actuated to when the accelerator pedal is not actuated. If this function is active, then setpoint filling torque MSOLLFÜ is determined in step 2028 as a function of predicted torque MPRÄD and as a function of a filter T. This filter may be, for example, a first-order low-pass filter. Then, step 2029 limits torque setpoint MSOLLFÜ to a maximum value, which is formed from the quotient of torque setpoint MSOLL and the lowest firing angle efficiency. After this step, step 204 is initiated. If the dashpot function is not active, then setpoint filling torque MSOLLFÜ is formed as the maximum value of torque setpoint MSOLL, predicted torque MPRÄD or torque MRES, which is selected on the basis of internal reserves (step 2027). After this step, step 204 is initiated.

Figure 5:
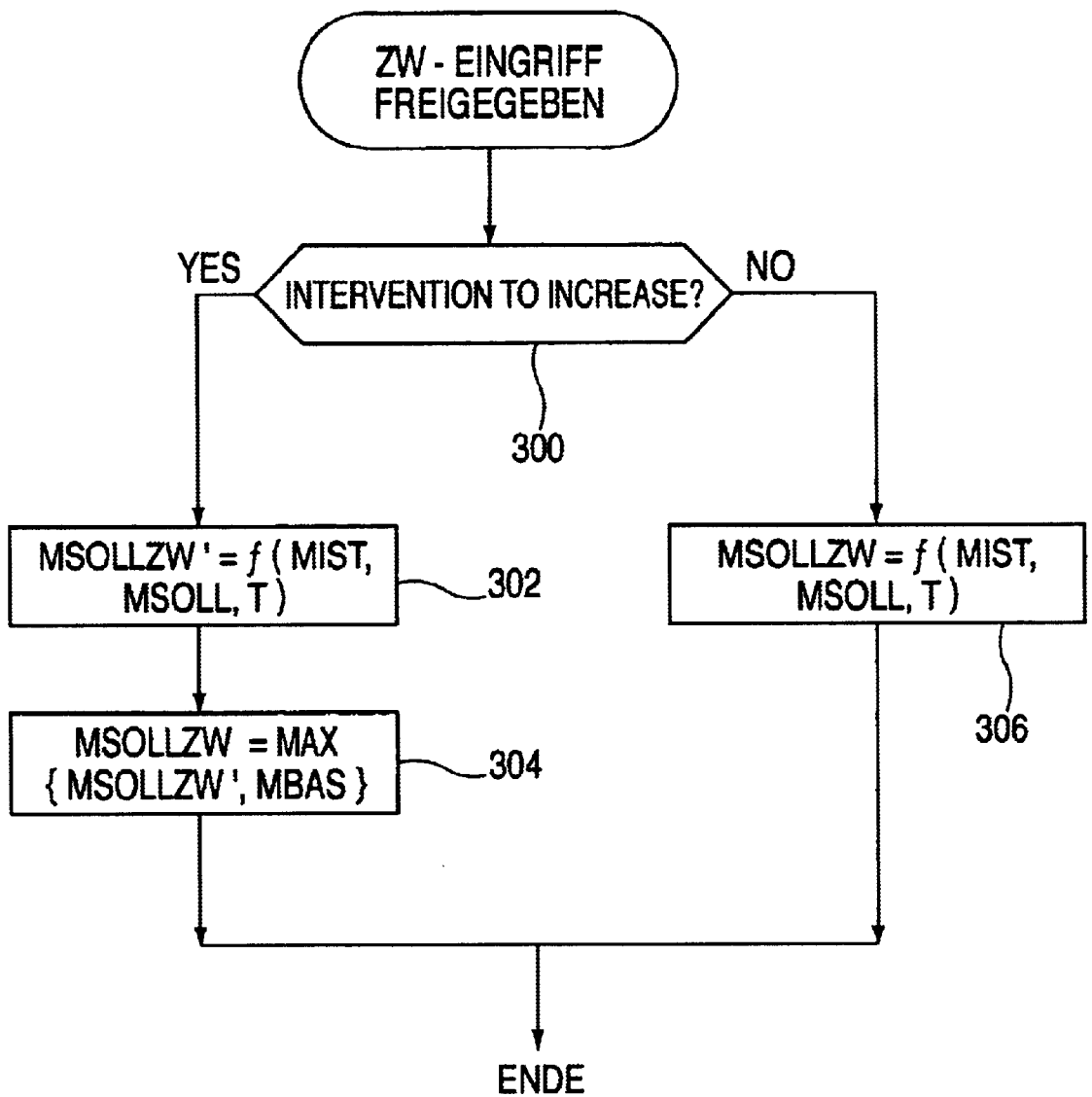

FIG. 5 is a flow chart illustrating the formation of the torque setpoint for the firing angle adjustment. The program outlined in FIG. 5 is initiated and executed at the specified points in time, if the firing angle intervention measure has been enabled. If not, the firing angle torque setpoint is set at the basic torque value, i.e., the filling torque setpoint. If so, step 300 ascertains whether a torque-increasing intervention measure is being implemented. If so, then, according to step 302, the torque setpoint for firing angle MSOLLZW' is calculated by interpolation on the basis of actual torque MIST, torque setpoint MSOLL and actuating time TSOLL. In performing this calculation, a change in the firing angle setpoint is implemented with each program run by interpolation, so that after a predetermined actuating time TSOLL has elapsed, desired torque setpoint MSOLL is reached. According to step 302, torque setpoint MSOLLZW is stipulated and output in step 304 as the maximum of value MSOLLZW' calculated in step 302 and basic torque value MBAS, i.e., the filling torque setpoint. If step 300 determines that a torque-reducing intervention measure is being implemented, torque setpoint MSOLLZW is formed in step 306 on the basis of the actual torque, the torque setpoint, and the actuating time according to a time-dependent interpolation, as described above with respect to step 302. Then, the program is terminated and re-executed.

The corresponding procedure, as illustrated in FIG. 5, is provided for determining the number of injections to be suppressed, the suppression pattern for each program run being determined by interpolation based on the torque setpoint, actual torque, and actuating time. The procedure described above is illustrated in FIG. 6 via time diagrams. The torque of the drive unit is plotted as a function of time. FIG. 6a represents a situation, in which desired torque setpoint MSOLL is achievable in desired actuating time TSOLL only on the basis of the filling path. Starting from MIST, the torque of the drive unit drops within time TSOLL to value MSOLL, the typical delayed filling control procedure occurring. Firing angle intervention is not enabled. A different situation is represented by FIG. 6b, in which desired torque MSOLL is not achievable by filling control alone within actuating time TSOLL. Therefore, firing angle intervention is enabled, leading to a rapid decline in torque within actuating time TSOLL from momentary actual torque MIST at the starting point to desired torque MSOLL within time TSOLL. The filling intervention occurring concurrently is indicated with a broken line. FIG. 6c shows the limiting situation because actuating time TSOLL is just large enough, so that, in the case of linear interpolation, the actual torque is initially below the desired torque due to the filling intervention, but then the desired torque is not exactly achievable after the actuating time has elapsed. If there is a reserve torque via the firing angle, an improvement in efficiency may be achieved in linear interpolation. (firing angle is advanced), whereas, in the case of a lack of reserve (optimum firing angle efficiency) at first, there is no worsening due to a retard of the firing angle, and this occurs only on reaching the desired torque in the last interval of time.

The procedure for the firing angle intervention is illustrated in FIG. 6d on the basis of the situation according to FIG. 6c. As described above, the torque setpoint for the firing angle MSOLLZW is interpolated with each program run by interpolation (linear interpolation here) between momentary actual torque MIST at the beginning of the intervention and the desired torque setpoint after actuating time TSOLL has elapsed. This results in the straight line illustrated in FIG. 6d, according to which, starting from the actual torque, the torque setpoint for the firing angle decreases successively in essentially equal increments until torque setpoint MSOLL reaches time TSOLL. Instead of linear interpolation, interpolation based on other functions, such as exponential functions, etc., may also be used in other exemplary embodiments according to the present invention.

What is claimed is:

1. A method of controlling the drive unit of a motor vehicle, the method comprising:
    setting at least one selection variable for an output variable of the drive unit, the selection variable being relayed;
    setting at least one manipulated variable of the drive unit as a function of the selection variable;
    setting at least one setpoint variable representing dynamics of the setting of the at least one selection variable, the setpoint variable being relayed; and
    selecting at least one manipulated variable as a function of the selection variable and the setpoint variable, wherein the setpoint variable includes a setpoint actuating time, and the setting of the at least one selection variable is performed within the setpoint actuating time.

2. The method according to claim 1, wherein the selection variable includes a torque setpoint.

3. The method according to claim 1, wherein the step of setting at least one setpoint variable includes setting a first setpoint variable as a function of the selection variable, the step of setting at least one manipulated variable includes setting a first manipulated variable for ensuring steady-state operation of the drive unit as a function of the first setpoint variable, and the step of setting at least one manipulated variable further includes setting an additional manipulated variable as a function of a second setpoint value derived from the selection variable when a corresponding dynamic requirement exists, thereby allowing a rapid change in the output variable.

4. The method according to claim 3, wherein the additional manipulated variable includes at least one of a firing angle and a suppression of individual fuel injections, and the first manipulated variable for ensuring steady-state operation of the drive unit includes one of the following:
    (a) a filling of an internal combustion engine, and
    (b) if the internal combustion engine operates with direct gasoline injection in stratified charge operation, a quantity of fuel to be injected.

5. The method according to claim 3, wherein the additional manipulated variable is influenced when the selection variable cannot be adjusted within a given period of time via the first manipulated variable.

6. The method according to claim 1, wherein a time required for setting the selection variable is determined as a function of a momentary operating state of the drive unit, and an additional manipulated variable is influenced to achieve the selection variable when a calculated time for setting the selection variable is greater than the setpoint actuating time.

7. The method according to claim 1, wherein individual injections are suppressed when the selection variable cannot be set within the setpoint actuating time via a change in a firing angle and a filling.

8. The method according to claim 1, wherein a measure intervening in a firing angle is enabled when one of a torque reserve is required, an anti-jerk function is active, a driving comfort function is active, and a torque setpoint is less than a minimum torque adjustable through a filling control.

9. The method according to claim 1, wherein a selection variable for controlling a steady-state operation of an internal combustion engine is determined as a function of one of a torque setpoint, a predicted torque value formed on the basis of an unfiltered intended torque of the driver, and a required reserve torque.

10. The method according to claim 3, wherein the first setpoint variable is calculated by considering intake manifold dynamics, at least when there are load changes with an increase in torque.

11. The method according to claim 1, wherein a model at least approximately representing a dynamic response of an intake manifold is used in selecting the at least one manipulated variable.

12. A device for controlling the drive unit of a vehicle, comprising:
    a control unit including a microcomputer, the control unit setting at least one selection variable for an output variable of the drive unit, the control unit influencing at least one manipulated variable of the drive unit as a function of the selection variable, wherein the microcomputer includes a program that receives the at least one selection variable and an additional selection variable representing required dynamics of the setting of the at least one selection variable, the microcomputer selecting a manipulated variable to be influenced as a function of the at least one selection variable and the additional selection variable, the additional selection variable including a setpoint actuating time, and wherein the control unit sets the at least one selection variable within the setpoint actuating time.

* * * * *